United States Patent [19]

Arthur

[11] 4,173,179

[45] Nov. 6, 1979

[54] COOKING ASSEMBLY

[75] Inventor: Richard P. Arthur, Darien, Ill.

[73] Assignee: Sunbeam Corporation, Chicago, Ill.

[21] Appl. No.: 839,650

[22] Filed: Oct. 5, 1977

[51] Int. Cl.² .................... A47J 27/00; H05B 1/00
[52] U.S. Cl. .................................. 99/374; 99/375; 99/425; 99/446; 99/448; 219/386; 219/432; 219/443; 219/475; 219/524
[58] Field of Search .................... 219/385–387, 219/436, 438, 443, 472, 474–475, 520–521, 524–525, 535, 523; 99/339–340, 372–385, 422–426, 428, 432, 439, 440–442, 445–449, 400; 100/93 P; 425/408

[56] References Cited

U.S. PATENT DOCUMENTS

| | | | |
|---|---|---|---|
| 1,648,335 | 11/1927 | Cole | 99/374 |
| 1,754,800 | 4/1930 | Preston | 99/374 |
| 2,116,688 | 5/1938 | Ratliff | 99/424 UX |
| 3,384,195 | 5/1968 | Jepson et al. | 219/438 |
| 3,593,648 | 7/1971 | Walters | 99/400 X |
| 3,963,898 | 6/1976 | Tuckwell | 219/535 X |
| 4,011,431 | 3/1977 | Levin | 219/524 |

*Primary Examiner*—Volodymyr Y. Mayewsky
*Attorney, Agent, or Firm*—George R. Clark; Neil M. Rose; Clifford A. Dean

[57] ABSTRACT

A cooking assembly includes a heating plate and two identical outer plates each fabricated of heat conductive material and each including a handle. The outer plates and the heating plate each include a hinge to allow the outer plates to be coupled to opposite sides of the heating plate. Each of the first and second outer plates when coupled to the heating plate define a cooking chamber within which food may be cooked. The assembly further includes an insulating drip tray for insulating the cooking assembly from means upon which it is supported and for catching drippings from the food being cooked by the heating plate. The tray includes means for supporting the cooking plate and the first and second outer plates in either a horizontal or a vertical position relative to the bottom of the tray to permit different selective cooking operations depending upon the nature of the material cooked.

18 Claims, 7 Drawing Figures

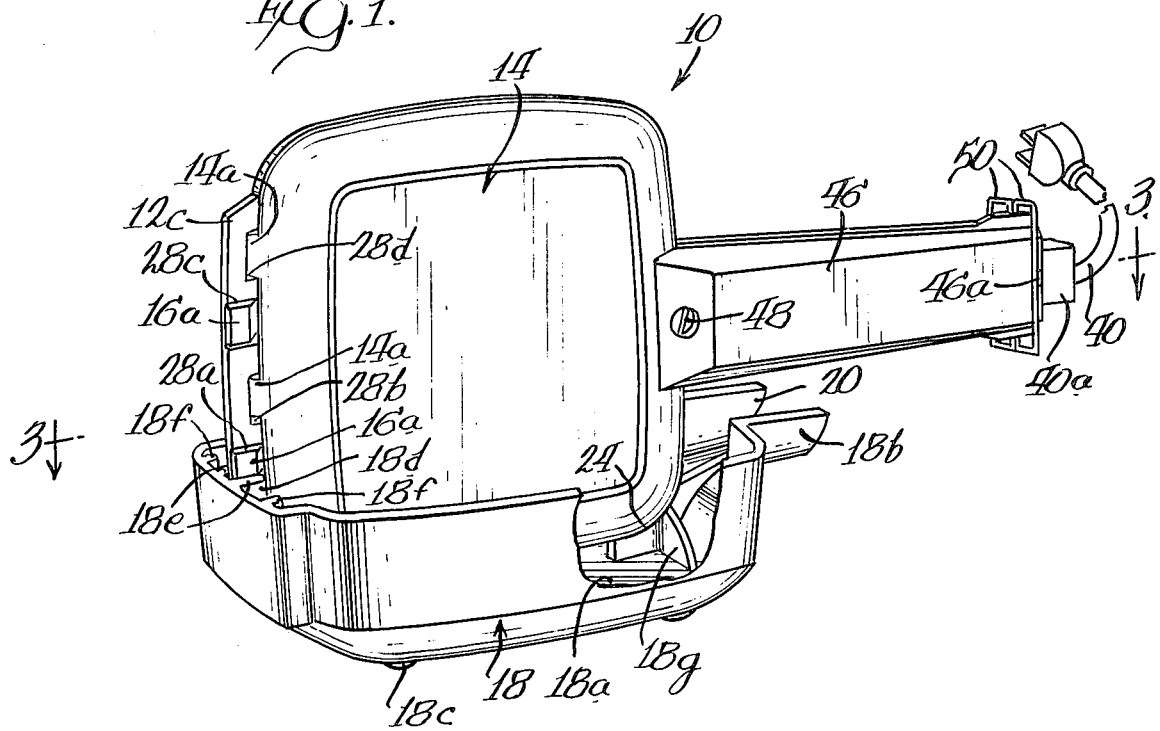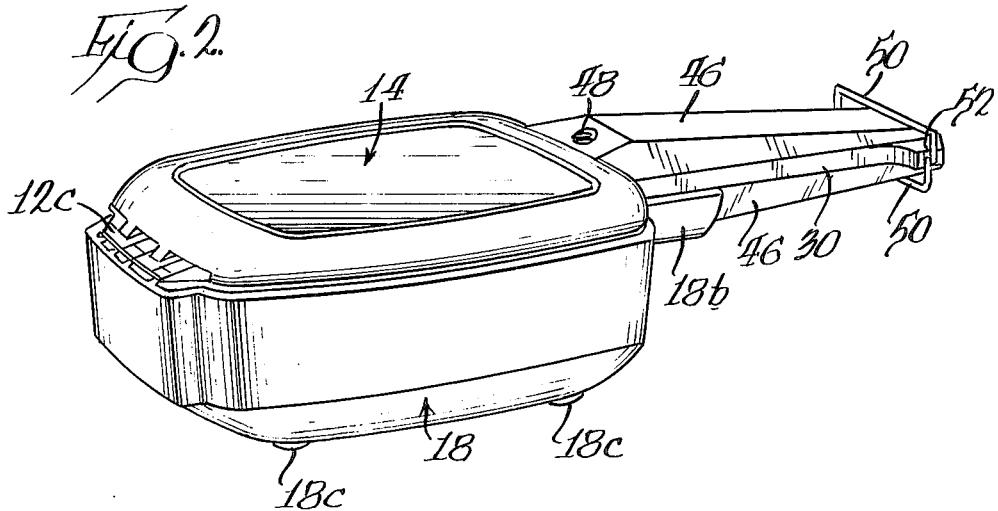

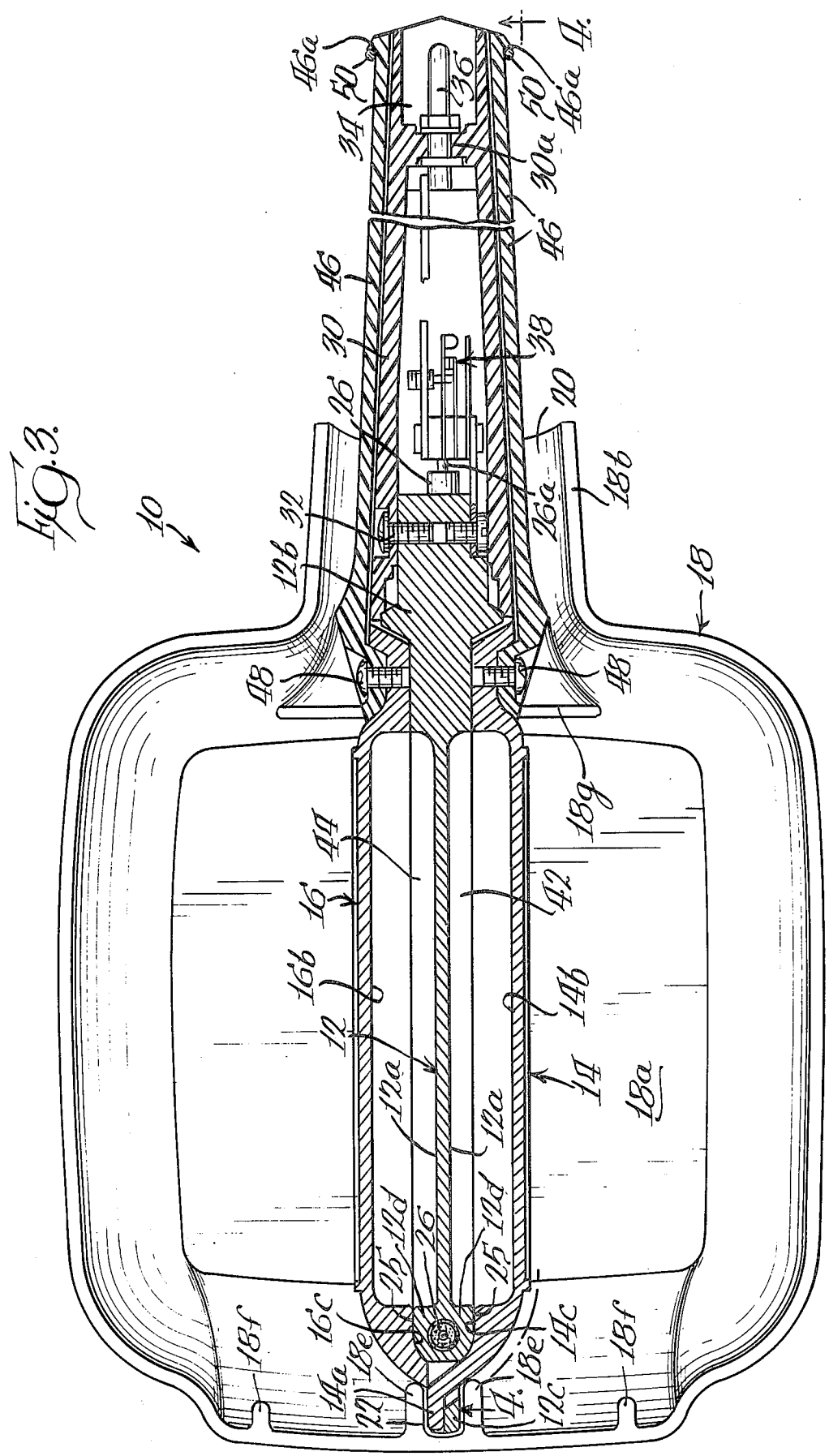

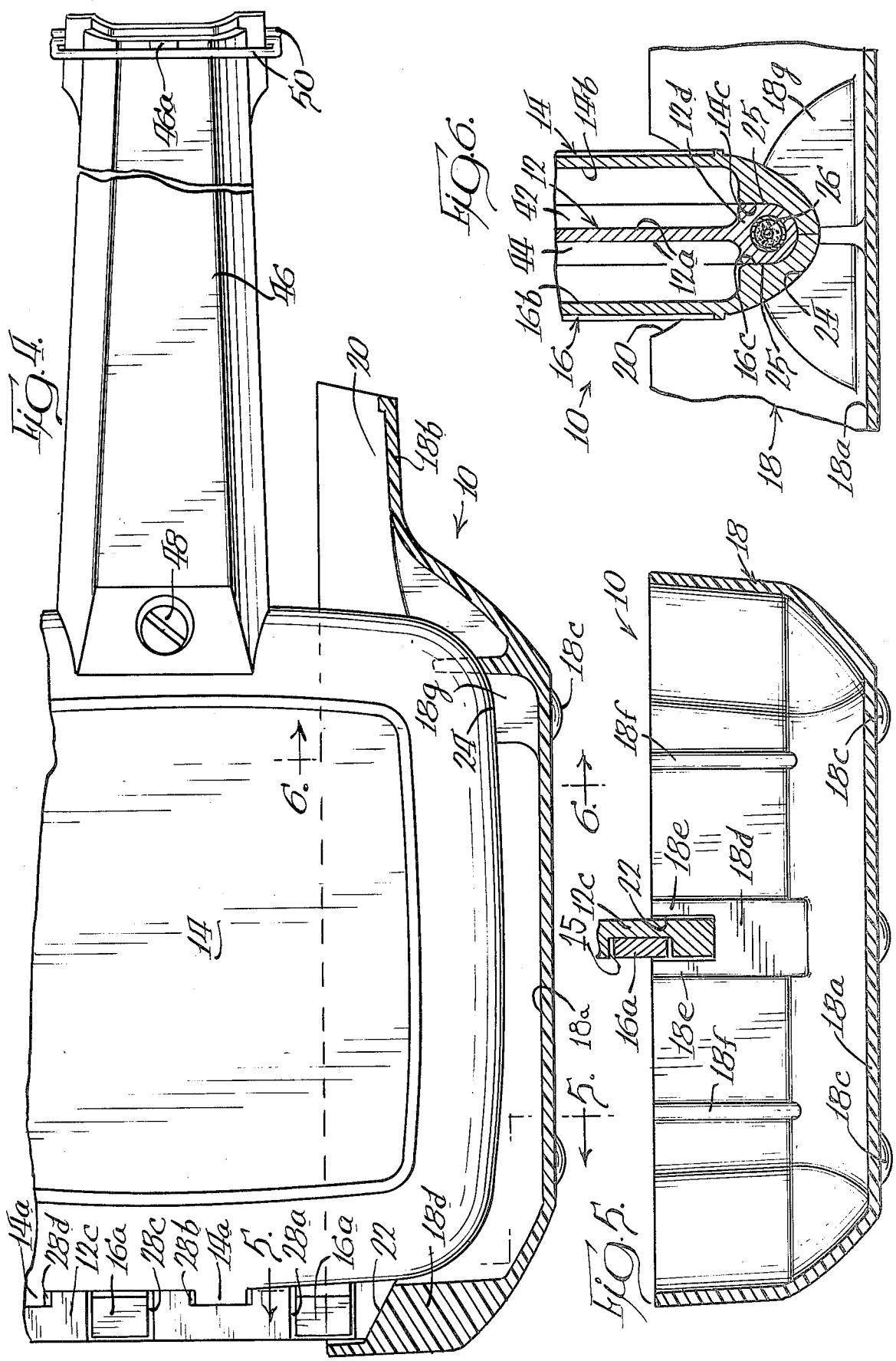

COOKING ASSEMBLY

BACKGROUND OF THE INVENTION

1. Field of the Invention

The device of the present invention relates to a new and improved assembly for cooking foods.

2. Description of the Prior Art

A recently popular cooking appliance for the home is the portable food or hamburger cooking appliance. This appliance includes an invertible plate for use between a heated cover and a base pan. The cover that may be fabricated from a heat conductive material and includes a depending rib to be selectively received in corresponding grooves, one on each side of the invertible plate. The rib contains an electric heating element. The space between the invertible plate and the cover defines a chamber in which food such as a hamburger patty or a sandwich may be cooked or gilled. Examples of these typical prior art cooking appliances are disclosed in U.S. Pat. Nos. 3,963,898 and 4,011,431.

One problem with such prior art cooking appliances is that they are only capable of cooking one sandwich or one hamburger patty at a time, since only one side of the invertible plate is usable during any one cooking interval. To overcome this problem, one prior art solution is to provide a larger plate for side-by-side heating or cooking. This doubles the size of the appliance while making it more cumbersome and difficult to handle, increases the storage problem and requires a larger heating element. In addition, if only one sandwich or hamburger patty is desired to be cooked, the larger heating element still heats the large unit although not in use.

A second problem with the prior art cooking appliances is that during the cooking of foods containing fat or grease, such as a hamburger patty, the juices and grease must be allowed to flow out of the cooking chamber to provide the best grilling conditions sometimes characterized as fat free grilling. One prior art solution is to provide holes or similar openings within the heating plate to allow grease to flow through the heating plate and into a collecting chamber such as a drip tray. A difficulty with this solution is that particles of food may be trapped within the holes or apertures closing them and preventing the free flow of grease from the cooking chamber. The openings also interfere with good heat transfer to the food.

SUMMARY OF THE INVENTION

An object of the present invention is to provide a new and improved assembly for cooking foods.

Another object of the present invention is to provide a new and improved compact device for cooking two sandwiches, two hamburger patties, etc. at the same time.

Still another object of the present invention is to provide an improved cooking device for simultaneously cooking foods on opposite sides of a heating plate disposed in either a vertical or horizontal position.

A further object of the present invention is to provide a new and improved device for cooking food while allowing effective drainage of drippings from the cooking area and to provide a means for selectively holding the cooking assembly in a desired position while catching the drippings.

A further object of the present invention is to provide a device for holding a cooking apparatus for cooking foods either in a configuration to allow grilling of the food or in a configuration to allow frying of the food.

A still further object of the present invention is the provision of an inexpensive cooking device having two identical outer plates and a center heating plate.

The present invention is directed to a new and improved assembly for cooking food such as hamburger patties or sandwiches. The assembly includes a cooking apparatus defined by a heating plate with an imbedded heating element and a handle including a temperature control device.

Two identical outer plates fabricated from a heat conductive material are hingedly connected to opposite sides of the heating plate. Once the outer plates are coupled to and closed on the heating plate they define two food chambers on opposite sides of the heating plate within which food such as hamburger patties, sandwiches or the like may be cooked, grilled, heated, etc. The outer plates each include a handle and means for locking these outer plates to the heating plate to define a single, easy to handle cooking apparatus.

The assembly also includes a drip tray which functions both as a supporting and storage vessel with a first support means such as a set of ribs to engage and hold the cooking assembly in a vertical position so that drippings of fat and grease may flow from the cooking chambers through the interfaces between the heating plate and the two identical cover plates into the drip tray allowing fat free grilling. The tray or support means also includes a second means including ribs and means defining recesses which engage the device including the handle and hold the cooking apparatus in a horizontal configuration to allow cooking or heating of the foods in one or both of the cooking chambers simultaneously.

BRIEF DESCRIPTION OF THE DRAWINGS

The above and other objects and advantages and novel features of the present invention will become apparent from the following detailed description of a preferred embodiment of the invention illustrated in the accompanying drawings wherein:

FIG. 1 is a perspective view (with cut-away portions) of the preferred embodiment of the cooking assembly of the present invention positioned in a vertical cooking orientation;

FIG. 2 is a perspective view of the same cooking assembly of the present invention positioned in a horizontal cooking orientation or in a storage condition;

FIG. 3 is an enlarged sectional view taken along line 3—3 of FIG. 1;

FIG. 4 is a view with a portion cut-away taken along line 4—4 of FIG. 3 assuming that FIG. 3 shows the entire structure;

FIG. 5 is a partial sectional view taken along line 5—5 of FIG. 4 assuming that FIG. 4 shows the complete structure;

FIG. 6 is a partial sectional view taken along line 6—6 of FIG. 4 again assuming that FIG. 4 shows the entire structure.

DETAILED DESCRIPTION OF THE PREFERRED EMBODIMENT

Figure 7:
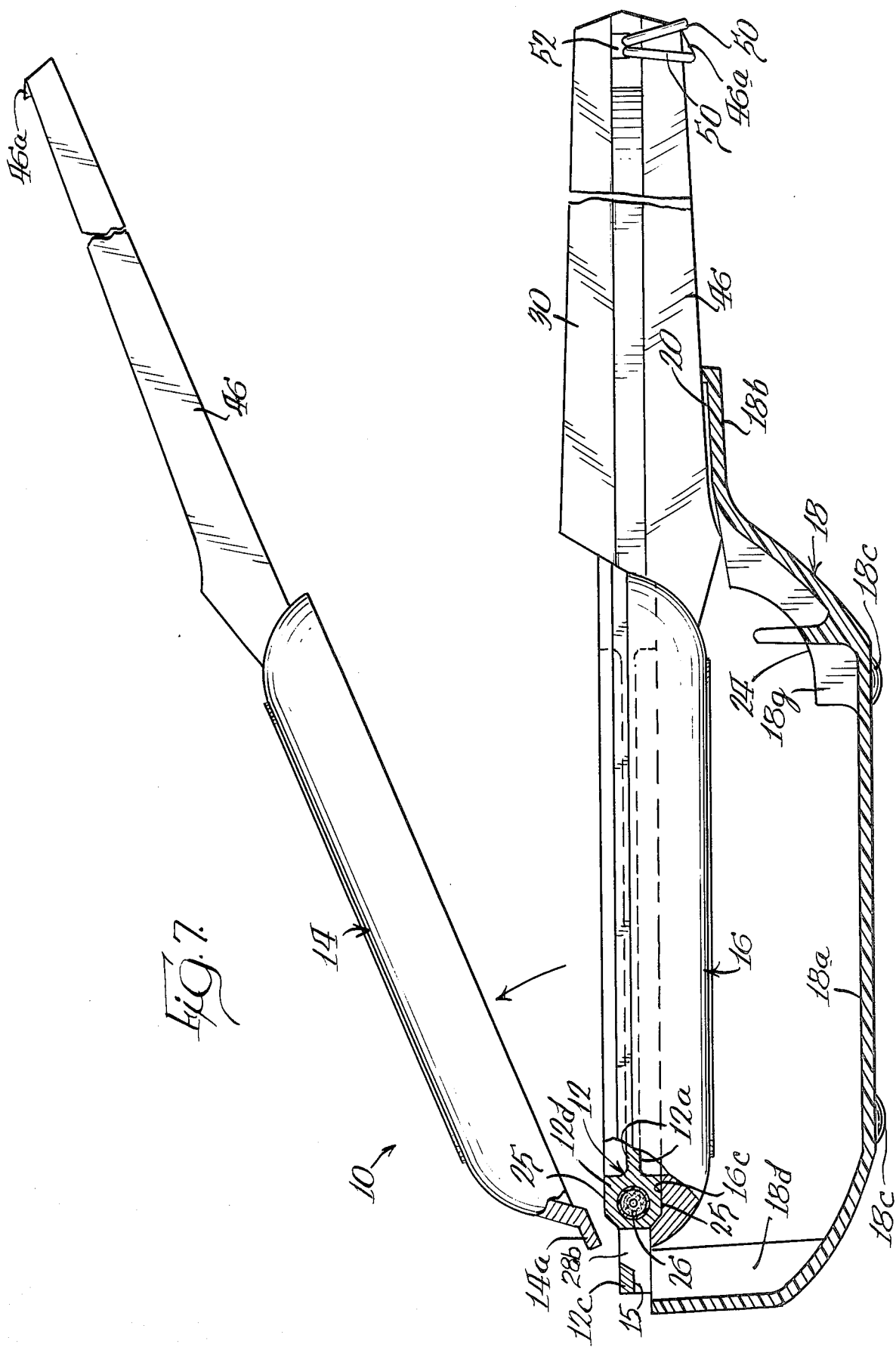
FIG. 7 is a side elevational view, with certain portions cut-away, of the cooking assembly in the orientation of FIG. 2 but with one of the outer plates lifted and separated from the heating plate, a position this outer plate might assume when food is being inserted into or removed from the cooking chamber defined by the cooking plate and said lifted outer plate.

Referring now to the drawings and initially to FIGS. 1 and 2 thereof, there is disclosed a cooking assembly generally designated by the reference numeral 10. The cooking assembly 10 is employed to cook, grill, fry or heat food such as hamburger patties, sandwiches, steaks, etc. in a short period of time. It also is capable of virtually fat free grilling.

The cooking assembly 10 essentially includes four separate elements, two of which are identical for simplification of manufacture. These four elements comprise heating means in the form of a heating plate 12, normally sandwiched between two identical outer members or plates specifically designated by different reference numerals, 14 and 16, respectively, and a supporting means 18 which also functions as a drip tray or collecting means for liquids that might be expelled during the heating or cooking operation. As described in more detail hereinafter, the heating plate 12 and outer plates 14 and 16 are adapted to be held in an assembled relationship during some cooking operations.

So that the assembled elements 12, 14 and 16 which become heated during a cooking operation may be supported on any surface, the supporting means 18 is preferably molded from a suitable plastic material which will withstand the temperatures involved and the hot greases that might contact the inner surface thereof. The combined supporting means and drip tray 18 is constructed to hold the assembled plates in two cooking positions. The first may be called a vertically oriented grilling position best shown in FIGS. 1, 3, 4, 5 and 6 while the second may be called the horizontally oriented cooking position best shown in FIGS. 2 and 7. The second position may also be termed the compact storage position when the cooking assembly is not in use. It will be appreciated that in the vertically oriented cooking position shown in FIG. 1 of the drawings the planes of the plates 12, 14 and 16 are substantially perpendicular to the bottom 18a of the drip tray 18 while in the horizontally oriented cooking position or in the storage position these planes are generally parallel to the bottom 18a of the tray 18.

The combined supporting means and drip tray 18 comprises a generally rectangular shallow open topped vessel with an integral short handle-like extension 18b. The extension 18b is shaped to define a shallow recess 20 on the upper side thereof as viewed in the drawings which recess connects directly with the drip receiving portion of the drip tray 18. Preferably, the drip tray 18 is provided with integrally formed feet 18c thereby to space the bottom 18a slightly above any supporting surface upon which the drip tray is placed.

To perform its supporting function, the tray 18 is provided with integrally formed ribs or projections in the interior of the vessel portion thereof. Thus, at the center of the side remote from the handle portion 18b there is provided a vertically disposed inwardly directed rectangular post 18d. The top of the post 18d is notched to define a shallow recess 22 between a pair of ribs 18e best shown in FIGS. 1, 3 and 5 of the drawings. The tops of the post 18d, and hence the ribs 18e, are flush with the top edge of the tray. Additional inwardly directed ribs or projections 18f are provided on the same side of the tray 18 as the post 18d and ribs 18e, also flush with the top edge of the tray. Within the tray 18 adjacent the recess 20 in extension 18b is a cross-shaped upwardly directed projection 18g molded integrally with the tray 18, the function of which will become apparent when the use of the cooking assembly 10 is described hereinafter. Portions of the cross-shaped projection 18g are recessed to define a supporting pocket 24 (FIGS. 1, 4, 6 and 7).

Referring now to the three plates 12, 14 and 16 defining the heating or cooking portion of the assembly 10, the heating plate 12 will first be described. It comprises a rectangular plate 12 defining on each side thereof a flat cooking surface 12a. Plate 12 includes an integral stub handle portion 12b projecting from the center of one edge of the plate. It also includes an integral narrow extension 12c projecting from the opposite edge. Surrounding the periphery of the rectangular plate inside the projections 12b and 12c and effectively circumscribing the cooking surfaces 12a on either side thereof is an integral projecting rib 12d which projects from both sides of the surfaces 12a of the plate 12. The rib 12d defines the extent of the cooking surface 12a on each side of plate 12 within the confines of projecting rib 12d. The rib is illustrated as having a somewhat flattened surface 25 (FIGS. 3, 6 and 7) on each face projecting from surfaces 12a.

To heat the heating plate 12, a conventional sheathed type electric heating element 26 is cast in or otherwise embedded in the rib 12d with the terminals 26a of such heating element 26 projecting from the stub handle 12b as best shown in FIG. 3 of the drawings. Preferably the heating plate 12 is formed as a one piece casting with the heating element embedded in the rib during the casting operation.

So as to make possible hinging of the cover plates 14 and 16 to the heating plate 12 in a simple and inexpensive manner, the narrow extension 12c, which preferably extends along a major portion of said one edge of plate 12, is provided with four rectangular shaped openings 28, specifically designated as 28a, 28b, 28c and 28d for receiving hinge fingers 14a and 16a formed as integral projections on a corresponding edge of each of the identical cover plates 14 and 16 respectively. As described hereinafter, each plate 14 and 16 has two spaced fingers 14a and 16a respectively. To provide proper alignment of the fingers 14a and 16a the extension 12c is provided with recesses 15 (FIGS. 5 and 7) adjacent each of the openings.

For the purpose of handling the heating plate 12 and also to house the terminals 26a projecting from the stub handle 12a there is provided an insulating tubular or hollow handle 30 (FIG. 3), preferably formed from a heat resistant material such as a phenolic resin. One end of handle 30 is adapted to telescope over the stub handle 12b and is secured thereto and, hence, to heating plate 12 by suitable fastening means indicated at 32. The other end of hollow handle 30 is provided with a plug receiving recess 34 within which are mounted suitable rigid bayonet-type male terminals 36. These terminals, in conventional fashion, may be supported by an integral wall portion 30a in hollow handle 30. Preferably also the terminals 26a of the sheathed heating element and the terminals 36 are electrically interconnected by conventional electrical circuit means, through a thermostatically controlled switch of any suitable type generally indicated at 38.

The sheathed heating element 26 may be energized from a suitable source of electric power through a conventional power cord 40 (FIG. 1) when the female plug connector 40a of such power cord is inserted in plug recess 34 and the thermostatically controlled switch is in the closed position. Preferably, to prevent overheating of plate 12, the switch portion of said thermostatically controlled switch 38 is normally closed and opens when the heating plate reaches a predetermined elevated temperature.

The cover plates 14 and 16 are provided to define with each heating surface 12a of the heating plate 12 a cooking chamber. These cooking chambers are best shown in FIG. 3 of the drawings and are designated as 42 and 44 respectively. They are defined on one side by one of the two flat surfaces 12a of heating plate 12 within the confines of projecting rib 12d and on the other side by flat cooking surfaces 14b or 16b of cover plates 14 and 16 respectively.

Each cover plate 14 and 16 is preferably an aluminum die casting and is essentially a shallow generally rectangular vessel of a shape and size comparable with that of heating plate 12, the bottom of the vessel being designated as 14b or 16b as noted above. Surrounding the flat cooking surfaces 14b or 16b is a raised narrow flat ledge 14c or 16c, as the case may be, shaped to conform closely and in intimate heat exchange relationship with surface 25 of the projecting rib 12d, when the elements 12, 14 and 16 are assembled for a cooking or grilling operation as best shown in FIGS. 3 and 6 of the drawings.

So that the plates 14 and 16 may be manipulated during a cooking operation each has secured to the edge opposite the edge supporting the integral fingers 14a and 16a an insulating handle 46, each such handle having one end thereof secured to the associated cover plate 14 or 16 by suitable fastening means 48 as best shown in FIG. 3 of the drawings. Preferably, the handles 46 are channel-shaped to receive in the channel defined thereby portions of the heating plate handle 30 when heating plate 12 is sandwiched between cover plates 14 and 16 as shown in FIGS. 2, 3 and 7 of the drawings.

The fingers 14a and 16a, as illustrated in FIG. 7 of the drawings, each comprise narrow projections including a short end portion disposed in a plane parallel with the associated cooking surface 14b or 16b as the case may be, and a short angularly disposed portion connecting the end portion to the edge of the cover plate 14 or 16.

To perform certain cooking or grilling operations, each cover plate is hingedly connected to the heating plate by means of the fingers 14a and 16a engaging the openings 28. When the three elements 12, 14 and 16 are moved so their relative positions correspond with that best shown in FIG. 3 of the drawings they define the two closed heating chambers 42 and 44 respectively.

So that these plates remain in this position to provide the closed heating chambers, two wire like bails 50 are provided pivotally mounted to the heating plate handle 30 in recesses 52 provided adjacent the end of this handle 30. Adjacent the projecting ends of cover plate handles 46 are latching members or catches 46a integrally formed as a projection from each of the handles 46. One or both bails 50 may be latched by latch or catch 46a to hold the associated cover plate 14 and 16 in the cooking position as shown in FIGS. 1, 2, 3 and 7, FIG. 7 showing only one bail 50 in latching position.

It should be understood that although the plates 12, 14 and 16 are shown as preferably of a generally square or rectangular configuration they might be of a circular or some other desired configuration.

From the above description, it will be apparent that the heating unit 12-14-16 can be supported in at least two positions in use. The fat-free grilling position is shown in FIG. 1, the storage position is shown in FIG. 2 and a frying position is shown in FIG. 7 where the plate 14 is removed and the exposed surface 12a of the heating plate 12 can be used as a frying surface or other cooking surface.

In the storage position or which is also the horizontal frying or cooking position, shown in FIGS. 2 and 7 of the drawings, the elements 12, 14 and 16 or at least some of these elements, including element 12, are supported by the supporting means 18 with the handle portion 46 resting in the recess 20 of the short handle-like extension 18b, while the narrow extension 12c of heating plate 12 rests on the ribs 18d and 18f, as clearly shown in FIGS. 2 and 7 of the drawings. It will be appreciated that when supported in the position shown in FIG. 2 of the drawings, a very compact storage position results so the cooking assembly 10 will take up a minimum space in a cupboard or other storage place.

It will also be appreciated that in the position of the elements shown in FIG. 7, any cooking operation can be performed on the exposed surface 12a just as if the unit were a small fry pan. Similarly, in the horizontal position of FIG. 2, cooking, heating or grilling operations can also be performed with food disposed in one or both of the cooking chambers 42 and 44.

For fat-free grilling, the device is perferably supported as shown in FIGS. 1, 3, 4, 5, and 6 of the drawings, where the narrow extension 12c along one edge of heating plate 12 (which extension will have the interengaged fingers 14a and 16a of the cover plates 14 and 16, respectively) received in the shallow recess 22, best shown in FIG. 5 of the drawings. This supports the portion of the unit remote from the handles 30 and 46 in the vertical position. The corner of the heating unit disposed in the drip pan 18 adjacent the recess 20 then rests in the pocket 24 formed by the projection 18g. In this way, any grease or juices which are released from the food being cooked will flow by gravity toward drip pan 18 and will pass through the spaces between the contacting portions of the heating plate 12 and the cover plates 14 and 16.

From the above discussion, the operation of the cooking device of the present invention will readily be apparent to those skilled in the art. Preferably, in cooking hamburger patties for example, the cooking assembly 10 will first be placed in the position similar to that shown in FIG. 7 of the drawings with power connected to the terminals to preheat the unit. Food such as a hamburger patty is then placed on the exposed cooking surface 12a of the heating plate 12. The cover plate 14 is then lowered to close the unit and the clamp or bail 50 is moved to engage the catch or latch 46a. The entire unit is then turned over through an angle of 180° so the cover plate 14 is downwardly. Then the cover plate 16 is raised to permit access to the opposite heating surface 12a, whereupon food such as a second hamburger patty, is placed on this surface and the cover 16 then closed and latched by the bail 50 and the catch 46a. The unit is then placed in the vertical position of FIG. 1 until the desired cooking operation has been completed.

Should it be desired to perform the cooking function with the unit in the horizontal position as in FIGS. 2 and 7, it will function precisely as when supported in the manner of FIG. 1, except that juices will not escape into the drip tray by gravity as when in the vertical position.

It will readily be understood that, if only one hamburger patty is desired to be grilled, then only one of the two chambers 42 or 44 will be used, but when it is desired to grill two hamburger patties or cook food on both sides, this is readily accomplished in a device of the same size required to cook one patty.

While only a single embodiment of the present invention has been shown it will be understood that various changes and modifications may occur to those skilled in the art and it is contemplated by the appended claims to cover all such changes and modifications as fall within the true spirit and scope of the present invention.

What is claimed as new and desired to be secured by Letters Patent of the United States is:

1. A cooking device for fat-free grilling comprising a, rigid heating plate of heat conductive material defining a first flat heating surface, an outer plate, including a second flat heating surface, means for hingedly relating said outer plate and said heating plate to define a cooking chamber between said heating surfaces, a first handle extending from said heating plate, a second handle extending from said outer plate, means associated with the ends of said handles remote from said plates for holding said plates in position to define said cooking chamber, an insulating drip tray, said drip tray including means for supporting said plates in a generally vertical plane, and electric heating means for heating said plates, the vertical orientation of said plates permitting grease to flow by gravity from said cooking chamber into said drip tray.

2. The cooking device of claim 1 wherein a second outer plate having a third flat cooking surface is hingedly related to said heating plate on the side opposite the location of said first mentioned outer plate, said second outer plate having a flat cooking surface to define with said heating plate a second cooking chamber, whereby simultaneous grilling of food disposed in each of said cooking chambers can be accomplished.

3. The cooking device of claim 1 wherein said drip tray includes means for supporting said plates with the cooking surfaces disposed in a generally horizontal plane.

4. The cooking device of claim 2 wherein said drip tray includes means for supporting the three plates with the cooking surfaces all disposed in a generally horizontal plane.

5. A cooking device comprising a generally square shaped flat, rigid heating plate of heat conductive material having a cooking surface on both sides thereof, a rib integrally formed with said plate and disposed around the periphery of said plate, said rib projecting somewhat from each side of said plate to define a narrow raised portion on each side of said plate whereby said cooking surfaces are each bounded by said narrow raised portions, an electrically insulated electric heating element embedded within said rib, said heating element having terminals, a stub handle integrally formed with said plate and projecting from one edge, a hollow insulating handle enclosing said stub handle and secured thereto, said hollow handle enclosing the terminals of said heating element, a narrow integral extension projecting from the edge of said plate opposite said one edge, means defining a plurality of openings, in said narrow extension, a pair of identical outer plates each including a plurality of fingers receivable in said openings to hingedly relate said outer plates with said heating plate one on either side of said heating plate, means on said cover plates for engaging in intimate heat exchange relationship with the narrow raised portion of said rib to heat said plates and food disposed between said heating plate and said outer plates.

6. An electric appliance for cooking foods comprising a that, rigid heating plate of heat conductive material, an electrically insulated electric heating element embedded in said heating plate, said heating plate having cooking surfaces on each side thereof said heating plate during a cooking operation being so oriented that said cooking surfaces are disposed in vertical planes;

a first outer plate of heat conductive material, means for coupling said first outer plate to one side of said heating plate in heat conductive relationship to define a first cooking chamber between one side of said heating plate and said first outer plate; and a second outer plate of heat conductive material, means for coupling said second outer plate to said heating plate in heat conductive relationship to define a second cooking chamber between the other side of said heating plate and said second outer plate.

7. The appliance of claim 6 comprising drip tray means for receiving drippings from food during cooking with said appliance, and means associated with said tray means including means for supporting said plates during a cooking operation.

8. The appliance of claim 7 wherein said means for supporting said plates includes integral portions of said tray means for holding said plates so corresponding edges are disposed in said tray means to allow grease and other fluids to flow between the interfaces between said plates and into said tray means.

9. The appliance of claim 8 wherein said heating plate includes a handle and said first and second outer plates each include a handle, said handle on said heating plate enclosure means for connecting said electric heating element to a power source and further including means for controlling the temperature of said appliance.

10. The assembly set forth in claim 9 wherein said means for supporting said plates includes means for holding said plates in a position so as to be substantially parallel with the surface supporting said tray means.

11. The appliance of claim 6 wherein said means for coupling said outer plates to said heating plate comprise hinges whereby said first and second outer plates may be pivoted relative to said heating plate.

12. An electric appliance for cooking foods comprising:

a heating plate, said heating plate comprising a flat, rigid body of heat conductive material and an electrically insulating electric heating element embedded in said body, said body having heating surfaces on opposite sides thereof heated by said heating means defining food cooking areas, a first outer plate including first hinge means on a portion of the periphery of said first outer plate for hingedly coupling said first outer plate to said heating plate to define with one of said heating surfaces a first chamber for holding food while being heated when said first outer plate is closed against one side of said heating plate, a second outer plate including second hinge means on a portion of the periphery of said second outer plate for hingedly coupling said second outer plate to said heating plate to define with said other heating surface of said heating plate a second chamber for holding food while being heated when said second outer plate is closed against the other side of said heating plate whereby food in said first and second chambers will be simultaneously cooked when said heating element is energized, each of said plates being provided with an elongated handle projecting from corresponding edges of said plates and latching means for latching the handles of said outer plates to the handle of said heating plate while food is being cooked in said chambers.

13. The appliance of claim 12 wherein the handles of said outer plates are each recessed to enclose a portion of the handle of said heating plate.

14. The appliance set forth in claim 12 including an insulating supporting means for supporting said plates in selective predetermined positions and for catching drippings from said chambers while food is being cooked therein while said plates are in one of said selective positions.

15. The appliance of claim 14 wherein said insulating supporting means includes a short extension defining an upwardly directed recess for supporting said handles when said plates are in another of said selected positions.

16. A food cooking device comprising:
a drip tray; food heating means including a food heating plate, said food heating plate including a flat, rigid body of heat conductive material and a handle attached thereto, said body including an electrically insulated electric heating element embedded therein and first and second parallel sides, said first and second sides each including means for holding food to be cooked;
said food heating means further including first and second identical outer plates, said first and second outer plates including means for joining said first and second plates in heat transfer relationship with said first and second sides of said heating plate, each of said first and second outer plates including means for holding food,
said tray including first holding means for holding said food heating means at least partially disposed therein in an orientation with said first and second sides of said heating plate being substantially parallel to each other and perpendicular to any support upon which said tray is placed.

17. The device of claim 16 wherein said tray further comprises second holding means for holding said food heating means at least partially therein in an orientation with said first and second sides of said heating plate being substantially perpendicular to any support upon which said tray is placed whereby drippings resulting from cooking food may flow by gravity between said plates into said tray.

18. The device set forth in claim 16 wherein said heating plate and each of said first and second outer plates are hingedly coupled together, said first and second inner plates being provided with an elongated handle and means for releasably securing each of said elongated handles to the handle of said heating plate thereby latching said heating plate and said first and second other plates in a relationship whereby heat from said electric heating element is transferred to all of said plates.

* * * * *